May 26, 1959
R. E. BURTON
2,888,051
BARK PEELER HAVING PIVOTED JAWS SPREAD BY FLUID PRESSURE
Filed Nov. 28, 1956
3 Sheets-Sheet 3
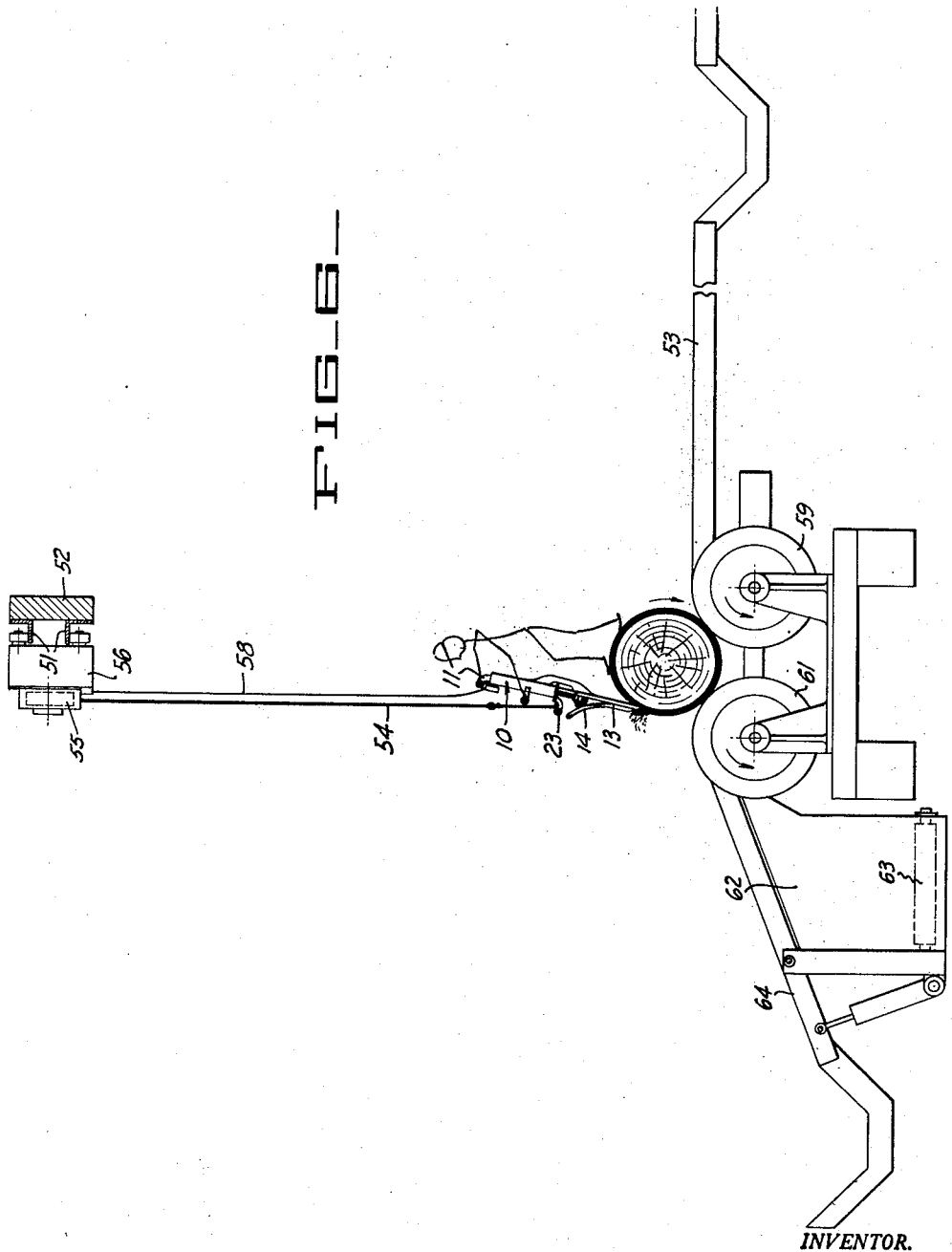
INVENTOR.
Robert E. Burton
BY
ATTORNEYS

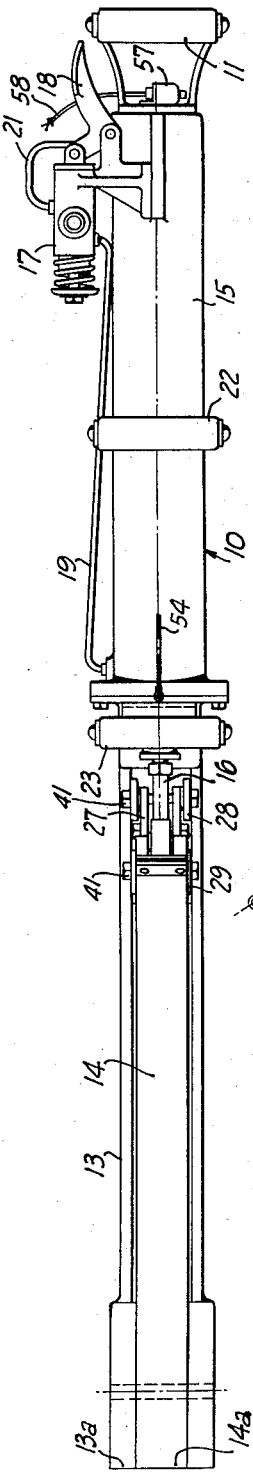

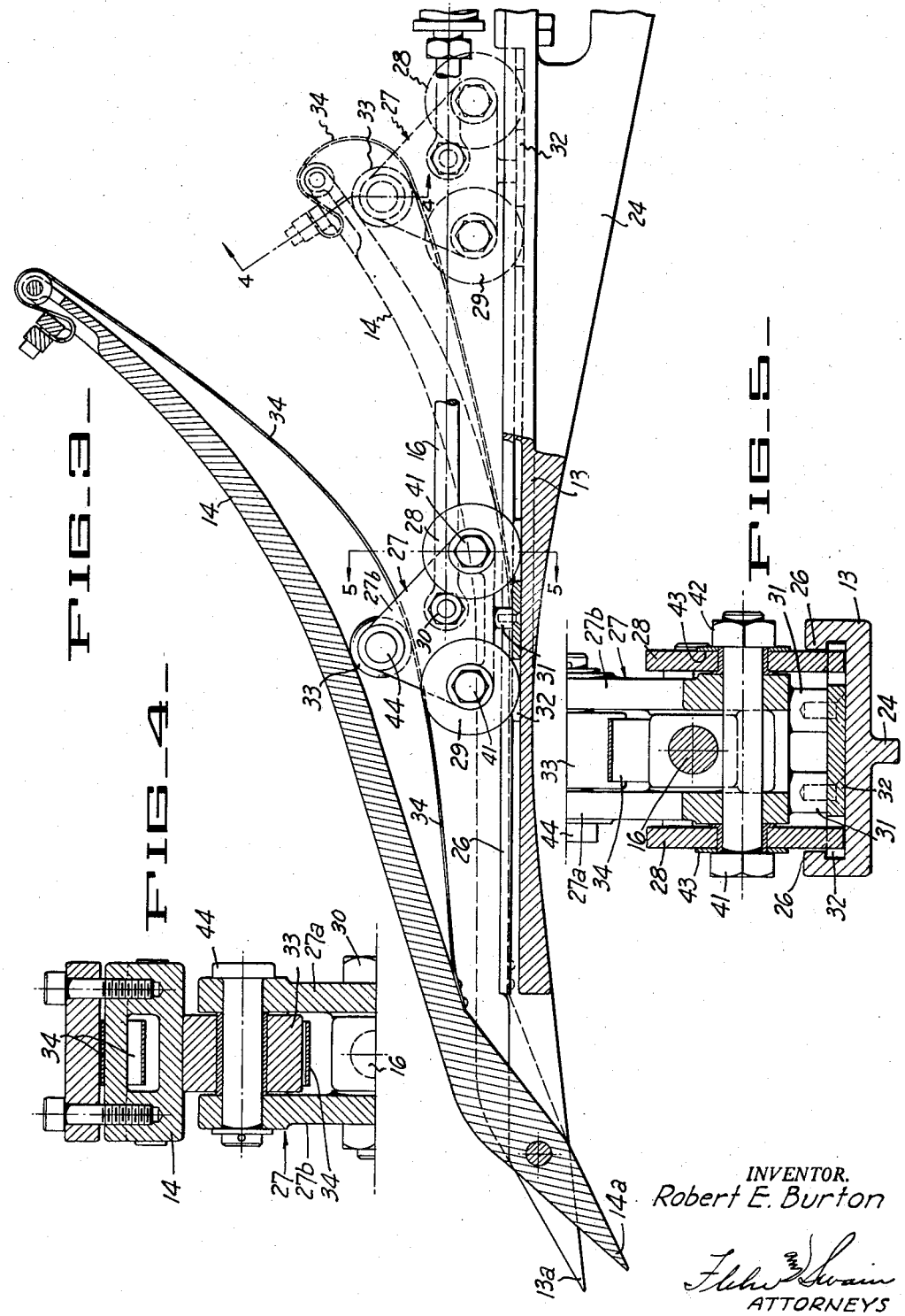

2,888,051
BARK PEELER HAVING PIVOTED JAWS SPREAD BY FLUID PRESSURE

Robert E. Burton, Willits, Calif.

Application November 28, 1956, Serial No. 624,773

6 Claims. (Cl. 144—208)

This invention relates to devices for peeling logs, and particularly to devices of this type which are portable and which are adapted to be used by a single operator.

In the past, it has been the general custom to fell a tree and then transport the same to a mill. The debarking process may take place where the tree falls, when logs are loaded onto trucks, or at the mill, and may be carried out any one of several ways. For example, debarking may be done manually by the use of peeling bars or may be done mechanically as, for example, by means of the method and apparatus disclosed in my Patent No. 2,611,401, dated September 23, 1952, or by use of the apparatus disclosed and claimed in my Patent No. 2,661,782, granted December 8, 1953.

It is an object of this invention to provide a manually operated, portable bark peeler which may be utilized either at the mill or in the woods and which may operate in a satisfactory manner for fibrous-bark species, such as redwood.

It is a further object of this invention to provide a device of this kind which is adapted to be operated by compressed air or hydraulic fluid pressure.

It is a still further object of this invention to provide a device of this character which is readily controlled and which reduces physical labor to a minimum and which will work with large or irregular logs which are difficult to rotate or feed by conventional machines.

It is a further object of this invention to provide a device of this kind in which positive jaw-opening-and-closing means are provided.

Other objects and advantages of this invention will appear from the following specification taken in conjunction with the accompanying drawings in which:

Figure 1 represents a top view of a device incorporating my invention;

Figure 2 represents a side elevation view of the device illustrated in Figure 1, dash-dot lines showing a jaw that has been pivoted to its open position;

Figure 3 represents an enlarged-scale side elevation of a portion of the device illustrated in Figure 1, but shows the jaws in full-open position;

Figure 4 is a cross-sectional detail taken along the line 4—4 of Figure 3; and

Figure 5 is a cross-sectional detail taken along the line 5—5 of Figure 3;

Figure 6 is a schematic view illustrating a method of supporting and utilizing the device illustrated in Figures 1 to 5, inclusive.

As indicated generally in the drawings my device consists of a body 10, a handle 11, and a pair of pivotally connected operating levers 13 and 14.

The body 10 consists generally of a cylinder 15 within which there is mounted a reciprocating piston of well-known type which operates a piston rod 16 in response to the introduction of fluid into the cylinder. A control valve 17 is provided for this purpose. The control valve is operated by means of a handle 18 and is customarily spring-loaded in such a manner that fluid or liquid under pressure is normally directed through a conduit 19 into the forward end of the cylinder 15 with the result that the piston therein is normally urged to the right, as viewed in Figures 1 and 2 so that jaw portions 13a and 14a of the levers 13 and 14 are in closed position. However, upon operation of the valve handle 18, the effect of the spring loading is overcome, the forward end of the cylinder 15 is vented, and fluid or liquid under pressure enters through a conduit 21 into the right end of the cylinder 15, as viewed in Figures 1 and 2, with the result that the piston therein is urged to the left, and that the jaw portions 13a and 14a are opened as indicated generally in Figure 3 and in dash-dot lines in Figure 2.

The handle 11 is mounted near one end of the device and is generally grasped by the right hand of the operator. At some suitable and intermediate point along the top wall of the cylinder 15, a second handle 22 is provided which may likewise be grasped by the operator, and a third supporting member 23 is provided at the left-hand end of the cylinder 15, as viewed in Figures 1 and 2, whereby the device may be suspended as shown in Figure 6 and as hereinafter described.

The source of liquid or fluid under pressure is of course maintained and since that constitutes no specific part of my invention, the same is not shown.

The body 10 is also provided with a forwardly extending bracket-like member 24 which supports the lower lever 13. As shown in Figures 3 and 5 particularly, the lower lever 13 is generally channel shaped along a substantial portion of its length, and is provided with inwardly extending flanges 26.

A reciprocable carriage 27 comprising plate-like side walls 27a and 27b is secured to the forward end of the connecting rod 16. As shown, the plate-like side walls are secured to the piston rod 16 by a bolt 30. Two pairs of rollers 28 and 29 are mounted outside the plate-like members as hereinafter described. Extending downwardly from the carriage 27 are a pair of bosses 31 that are secured to a cross-shaped shoe 32 which rides on the lever 13 and the crossarm of which extends beneath the flanges 26. The lever 13 serves to guide the carriage 27 as it reciprocates longitudinally along the track created by the member 13, and the inturned flanges 26 prevent the carriage 27 from leaving the track while being reciprocated between, for example, the positions illustrated by broken and solid lines in Figure 3. A roller 33 is mounted between the side walls 27a and 27b and is disposed between confronting surfaces of the lever 14 and a resilient spring-like member 34, one end of which is secured to one end of the lever 14 adjacent the pivot point between it and the lever 13, and the other end of which is secured to the remote end of lever 14. Thus, as the carriage 27 advances along the lever 13, as indicated in Figure 3, from the dotted-line position at the right to the full-line position at the left, the roller 33 rolls along the lower surface of the lever 14 and urges the jaw 14a to its open position.

As the piston rod 16 is moved to the right to retract the carriage 27 from the full-line position in Figure 3 to the dotted-line position, the roller 33 engages the resilient member 34 with the result that the lever 14 will be retracted to the dotted-line position shown in Figure 3. In this manner it is apparent that the upper lever 14 is at all times under the control of the operator and that the same will not be left in mid-air, so to speak, upon retraction of the piston rod 16. This enables the operator to have full control of both jaws for the purpose of prying the bark away from the wood.

It will be noted that the lever 14 has a particular curvature. Near the jaw portions of the levers the bark peeler is relatively thin which facilitates entry of the jaw portions 13a and 14a deep into the bark. The rear portion of the lever 14 is curved in such a manner that a uniform force applied by the piston rod 16 will cause a uniform separation pressure to be applied to the jaw portions 13a and 14a regardless of the position of roller 33 along the lever 14.

The specific means for mounting the rollers 28 and 29 upon the carriage 27 is shown particularly in Figure 5. The rollers 28 engage the inner edges of the flanges 26 so as to guide the carriage 27 along its track. They may be suitably mounted by means of a bolt 41, a nut 42 and suitable washers 43. The upper roller 33 is rotatably mounted between the side walls 27a and 27b of the carriage 27 (see Figure 4) by means of a bolt 44.

Operation of the device will now be described. The device is generally suspended from a supporting structure as hereinafter described. The device is also connected to a suitable source of hydraulic or pneumatic fluid under pressure. The jaws 13a and 14a normally occupy the full line position illustrated in Figure 2, so that they can penetrate a layer of redwood bark which is to be removed. Because of the spring loading of the valve 17, the carriage 27 will normally be retracted to the full-line position illustrated in Figure 2 and the dotted-line position illustrated in Figure 3. The operator, by actuating the valve handle 18, causes fluid under pressure to enter the cylinder 15 through the conduit 21, thus advancing the piston rod 16 and the carriage 27 to the left. The carriage will be maintained on a true course by the shoe 32 and the rollers 28, which, it will be recalled, are kept in proper position along the upper surface of the lever 13 by the inturned flanges 26. As the roller 33 moves along the lower surface of the lever 14, the jaws 13a and 14a will be forced apart, as indicated in Figure 3 with the result that bark will be stripped from the log.

Upon releasing the handle 18, the carriage 27 will be retracted, the roller 33 engaging the resilient member 34 and drawing the lever 14 downwardly to the dotted-line position of Figure 3 or to the full-line position of Figure 2.

Thus it will be seen that I have provided a log-debarking device by which the operator maintains full control over the jaws 13a and 14a. There is no chance of the lever 14 remaining in an open position, whereas if the resilient member 34 were not used, there would be no force, other than gravity, to move the lever to its retracted or starting position.

As illustrated in Figure 6 my device is particularly adapted to be supported from an overhead rail 51 which may be supported upon a suitable member 52 which may be a part of a building or a part of a structural assembly over the log deck 53. The device is particularly adapted to be suspended by a rubber shock cord 54, one end of which is connected to my device at a position adjacent the handle 23 and the other end of which is wound upon a reel unit 55 that is supported by a trolley assembly 56 mounted upon the rail 51 so that the device may be moved of itself and along the longitudinal axis of the log which is being peeled.

As is particularly illustrated in Figures 1 and 2 I provide an electric switch means 57 (Figure 2) having push buttons located adjacent the handle 11 where they are accessible to the operator of the device. The switch 57 through a conductor 58 serves to operate electric motors, not shown, which in turn control the rotation of log-supporting rollers 59 and 61 illustrated in Figure 6. Thus, when an operator has utilized my debarking device to remove a lengthwise swath of bark from a log, he may, by simply operating the switch 57, cause partial rotation of the rollers 59 and 61 in a counterclockwise direction as viewed in Figure 6 with the result that the log will be rolled a corresponding amount in a clockwise direction to present a new area from which bark can be removed.

During removal of a lengthwise swath of bark, my device may be moved along the log by the operator because the trolley assembly 56 is free to move along the overhead rail 51. After the bark has been removed it will fall into a bark-collecting zone 62 from whence it will be removed by a conveyor 63. After a log has been debarked, it is rolled over the roller 61 and down a ramp 64, a new log then being rolled from the log deck to the debarking zone onto the rollers 59 and 61.

The elastic cord 54 serves to support the weight of the bark peeler without interfering with the aim of the operator. Suitable means can be provided to adjust the length of the cord so that the bark peeler is at the proper elevation for logs of different sizes.

I claim:

1. In a debarking device, a pair of levers pivoted to form a pair of jaws adapted to be inserted beneath a layer of bark, a track formed integrally with one of said levers, a flexible track secured to the other of said levers, means for separating said jaws including a carriage mounted for reciprocation along said integral track and between said levers, a motor for reciprocating said carriage, said motor being mounted on said one lever and connected to said carriage, a shoe mounted on said carriage and engaging said integral track to prevent the carriage leaving said integral track during reciprocal movement, and a roller mounted on said carriage and disposed between said other lever and said flexible track so as to engage said other lever during jaw-separating travel of said carriage, and so as to engage said flexible track to retract said other lever during jaw-closing movement of said carriage.

2. In a debarking device, a pair of levers pivoted to form a pair of jaws adapted to be inserted beneath a layer of bark, means for opening and closing said jaws including a reciprocable carriage, a fluid motor for reciprocating said carriage, means for controlling said motor, rollers mounted on said carriage and engaging one of said levers to permit the carriage to be moved longitudinally along said one lever, a flexible track secured to the other of said levers, an additional roller mounted on said carriage and disposed between said other of said levers and the flexible track secured thereto whereby, when said carriage is advanced, said jaws are opened, and when said carriage is retracted, said jaws are closed.

3. A debarking device as in claim 2 together with an elastic member for supporting the same.

4. In a debarking device, a pair of levers pivotally connected to provide a pair of co-operating jaw-like members adapted to be inserted beneath a layer of bark on a log, a reciprocable carriage mounted on one of said levers, means for reciprocating said carriage longitudinally of said one lever, a relatively flexible elongate member carried by said other lever, and means mounted on said carriage and disposed between said other lever and the flexible elongate member whereby as said carriage is advanced and retracted, said jaw-like members are positively moved between opened and closed positions.

5. A debarking device as in claim 4 wherein said last named means is a roller.

6. A debarking device as in claim 4 wherein said flexible member is mounted on the inside of said other lever.

References Cited in the file of this patent

UNITED STATES PATENTS

| 467,706 | Nutting | Jan. 26, 1892 |
| 1,540,461 | Christlieb | June 2, 1925 |
| 2,640,516 | Wilson | June 2, 1953 |
| 2,661,782 | Burton | Dec. 8, 1953 |
| 2,705,982 | Ponts | Apr. 12, 1955 |
| 2,764,050 | Liebowitz | Sept. 25, 1956 |
| 2,769,468 | Swanson | Nov. 6, 1956 |

FOREIGN PATENTS

| 622,045 | Germany | Nov. 19, 1935 |
| 1,105,549 | France | July 6, 1955 |